March 10, 1925.
H. D'OLIER, JR
1,529,320
LAMP SHADE GAUGE
Filed March 1, 1921
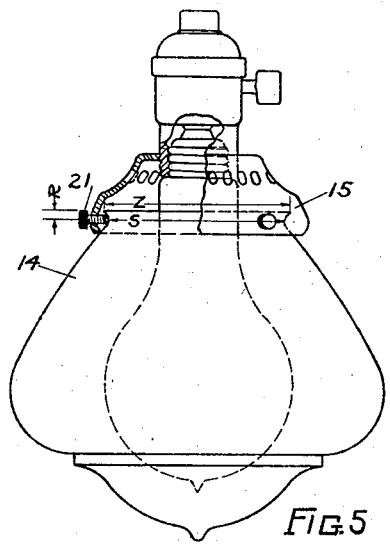
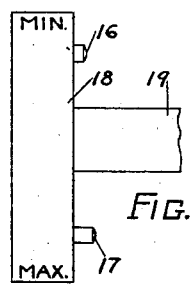
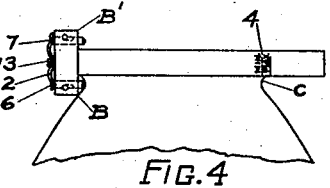
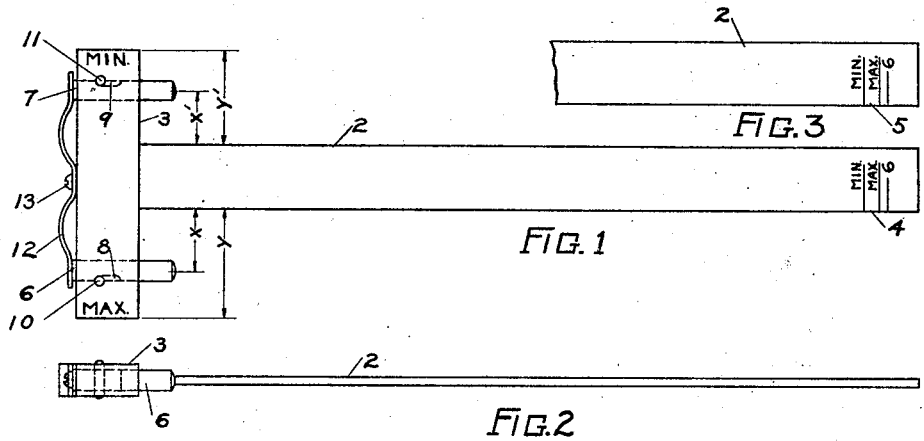
Inventor
Henry D'Olier Jr.
By Wayne B Wells.
Attorney Patented Mar. 10, 1925.

1,529,320

UNITED STATES PATENT OFFICE.

HENRY D'OLIER, JR., OF BRIDGEPORT, CONNECTICUT.

LAMP-SHADE GAUGE.

Application filed March 1, 1921. Serial No. 448,824.

*To all whom it may concern:*

Be it known that I, HENRY D'OLIER, Jr., a citizen of the United States, residing at Bridgeport, in the county of Fairfield and State of Connecticut, have invented certain new and useful Improvements in Lamp-Shade Gauges, of which the following is a specification.

My invention relates to gauges and, particularly to gauges for checking the essential dimensions of the heel portion of illuminating devices such as lamp shades, reflectors, and illuminating glass.

One object of my invention is to provide a gauge that shall check, at a single setting or two settings for maximum and minimum sizes respectively, the diameter of the top portion of a heel, the diameter of the neck of the heel, and the height of the neck.

It is desirable to check the heel portions of illuminating devices now used to enclose the modern filament lamp in order to determine quickly whether or not they may be fitted to, and supported from, standard canopies. The heel portions vary in size by reason of the differences in the thickness of the glass, and the differences in shrinkage and in grinding. Such defects are more common in blown illuminating glass than in pressed glass or in metal.

In a gauge constructed in accordance with my invention, all the aforesaid essential dimensions of the heel portions, irrespective of the type or contour are checked quickly and accurately.

Preferably, the gauge comprises a body portion, a cross-head portion which is made integral with, or fixedly connected to, the body portion, and pins which are mounted, preferably yieldably, in the cross-head portions at different distances from the body portion. The body portion has a maximum and a minimum limit marked on it and serves to check the top diameter of the shade. The pins not only check the diameter of the neck but also check the distance from the top to the point at which the holder screws would make contact.

In the accompanying drawing,

Figure 1 is a front view of a gauge constructed in accordance with my invention.

Fig. 2 is a side view of the gauge shown in Fig. 1.

Fig. 3 is a back view of a portion of the gauge shown in Fig. 1.

Fig. 4 is a view showing the application of the gauge to an illuminating device.

Fig. 5 is an elevational view showing the connection of an illuminating device to a standard canopy.

Fig. 6 is a view showing a modification of my invention wherein the pins are fixedly mounted.

Referring to the drawing and, particularly, to Figs. 1, 2 and 3, a gauge 1 comprises a body portion 2, and a cross-head portion 3. The cross-head portion 3 is preferably formed integral with the body portion 2, but, if so desired, the two portions may be fixedly connected together in any suitable manner. The body portion 2 carries maximum and minimum marks at 4 on the front face thereof, and is similarly marked at 5 on the rear face thereof, as indicated in Figs. 1 and 3 of the drawings.

The cross-head portion 3, which is disposed at right angles to the body portion 2, carries two pins 6 and 7. The pins project from the cross-head portion and are parallel to the body portion of the gauge. Preferably, each of the pins is movably mounted in the body portion and has a portion cut away, as shown at 8 and 9, to accommodate guide pins 10 and 11. The guide pins 10 and 11, which are fixedly attached to the cross-head, serve to limit the movement of the two pins 6 and 7. A spring member 12, which is connected to the cross-head portion by a screw 13, serves to exert a force tending to move the pins 6 and 7 to the position shown in Fig. 1 of the drawing.

The pin 6 is located at a distance $x$ from the lower edge of the body portion 2 and the lower end of the cross-head is located a distance $y$ from the lower edge of the body portion 2. The pin 7 is located a distance $x'$ from the upper edge of the body portion, and the upper end of the cross-head portion is located a distance $y'$ from the upper edge of the body portion 2. The distances $x$ and $y$, in the gauge shown, are greater than the distances $x'$ and $y'$, the pin 6 serving to indicate the maximum allowable dimension of the heel portion and the pin 7 serving to indicate the minimum allowable dimension, as will be set forth hereinafter. The maximum and minimum dimensions of the cross-head portion are determined in accordance with the dimensions of a standard canopy.

In checking the dimensions of the heel portion of an illuminating device such as shown in Fig. 5 of the drawing, it is essential to gauge the top diameter indicated by the distance z, the diameter of the neck portion indicated by the distance s, and the height of the neck portion to the horizontal line of contact as indicated by the distance R. It is essential to check such dimensions of the heel portion in order to fit the said heel portion 14 in the canopy 15, and secure it in position by means of the screws 21, one only of which is shown on the drawing.

The dimensions of the heel portion of an illuminating device are checked by placing the gauge in position on the top, as shown in Fig. 4 of the drawing, the lower corner B of the cross-head portion engaging the side of the shade. At the edge C of the heel, it is determined by the marks 4 whether or not the top diameter of the illuminating device is within the allowable maximum and minimum dimensions. The pin 6 enters the neck of the shade and should touch the neck when the point B of the cross-head is in engagement with the side. If the pin 6 does not touch the neck, the diameter of the neck portion is too small, and if the pin is so forced out against the spring member 12 as to prevent the point B from touching the side, the diameter is too large or the height of the neck is too small. In the latter case, the position of the gauge is reversed and the body portion 2 is placed with the marks 5 next to the top of the shade. The above process is repeated and the position of the pin 7 determines whether or not the heel portion comes within the allowable minimum dimensions.

Referring to Fig. 6 of the drawing, a simplified gauge is shown wherein pins 16 and 17 are fixedly mounted in a cross-head portion 18. The cross-head portion 18 is attached to a body portion 19 in any suitable manner. The gauge shown in Fig. 6 is somewhat simpler in construction than the gauge shown in Figs. 1 to 5, inclusive, and is operated in a similar manner to check the essential dimensions of an illuminating device.

From the above description, it is apparent the disclosed gauge checks the essential dimensions of a heel in a simple and efficient manner. Moreover, the gauge is simple in construction and reliable in operation. Although two settings of the gauge may be required to check the essential dimensions of the heel portion of an illuminating device, it is possible, in many cases, to check such dimensions by a single setting of the gauge.

Modifications in the gauge, and in the arrangement and location of parts may be made within the spirit and scope of my invention, and such modifications are intended to be covered by the appended claims.

What I claim is:

1. In a gauge, the combination comprising a body portion, a cross-head portion joined to the body portion, and two pins mounted on the cross-head at predetermined and slightly different distances from the body portion, said pins having limited movement parallel to the body portion.

2. In a gauge, the combination comprising a body portion, a cross-head portion, and yieldable pins mounted on the cross-head portion at different distances from the body portion.

3. In a gauge, the combination comprising a body portion, a cross-head portion joined to the body portion, two pins mounted on the cross-head at different distances from the body portion and having limited movement relative to the cross-head, and means for exerting a force tending to move said pins to initial position.

4. In a gauge for checking the heel portion of an illuminating device, the combination comprising a body portion having two sets of maximum and minimum markings thereon, a cross-head attached to the body portion, and yieldable pins mounted in the cross-head at different distances from the body portion.

5. In a gauge for checking the top of an illuminating device, the diameter of the neck of the heel and the height of the neck curve, the combination comprising a body portion, a cross-head portion, a pin mounted in the cross-head portion and having limited movement relative to the cross-head portion, and means for exerting a force tending to move the pin to initial position.

6. In a gauge for checking an illuminating device, the combination comprising a body portion having markings thereon for checking the top of the device, a cross-head attached to the body portion, and a pin mounted in the cross-head, said pin combined with the cross-head serving to check the diameter of the neck of the heel and the height of the neck curve at the same time as the diameter of the top of the device is checked.

7. In a gauge for checking an illuminating device, the combination comprising a body portion having markings thereon for checking the top of the device, a cross-head attached to the body portion, a pin mounted in the cross-head and having limited movement relative to the cross-head, and means for exerting a force tending to move the pin to initial position, said pin combined with the cross-head and the body portion serving to check the diameter of the neck of the heel and the height of the neck curve.

8. In a gauge for checking the heel portion of an illuminating device, the combination comprising a body portion having markings thereon for checking the top of the heel portion, means mounted on and cooperating with said body portion for checking the diameter of the neck portion, and means supported from and cooperating with said body portion for checking the height of the neck curve, said body portion cooperating with said different means to check the heel portion at a single setting of the gauge.

In testimony whereof, I hereto affix my signature.

HENRY D'OLIER, Jr.